United States Patent [19]

Duval

[11] Patent Number: 5,348,824
[45] Date of Patent: Sep. 20, 1994

[54] PROCESS OF COATING BY MELT EXTRUSION A SOLID POLYMER ELECTROLYTE ON POSITIVE ELECTRODE OF LITHIUM BATTERY

[75] Inventor: Michel Duval, Montreal, Canada
[73] Assignee: Hydro-Quebec, Montreal, Canada
[21] Appl. No.: 140,536
[22] Filed: Oct. 25, 1993
[51] Int. Cl.$^5$ .............................................. H01M 6/18
[52] U.S. Cl. ................................... 429/192; 29/623.5
[58] Field of Search ............... 429/192, 188; 29/623.5; 252/62.2

[56] References Cited

U.S. PATENT DOCUMENTS 4,303,748  12/1981  Armand et al. .
4,357,401  11/1982  Andre et al. .
4,578,326   3/1986  Armand et al. .
4,818,643   4/1989  Cook et al. .
4,968,319  11/1990  Muller et al. .
5,013,619   5/1991  Cook et al. .

FOREIGN PATENT DOCUMENTS 1269702  5/1990  Canada .

Primary Examiner—Anthony Skaparas
Attorney, Agent, or Firm—Oblon, Spivak, McClelland, Maier & Neustadt

[57] ABSTRACT

Polymer based amorphous compositions are melt extruded in the form of thin films, directly on the positive electrode of an all solid lithium battery. This procedure has many advantages as compared to the procedure using a solvent (rapidity, cost, quality of the interface, no problems with recycling and environment).

20 Claims, 2 Drawing Sheets

PROCESS OF COATING BY MELT EXTRUSION A SOLID POLYMER ELECTROLYTE ON POSITIVE ELECTRODE OF LITHIUM BATTERY

BACKGROUND OF INVENTION a) Field of the Invention

The present invention concerns the melt extrusion coating of a polymer electrolyte on the positive electrode of lithium batteries. The invention also concerns polymer electrolyte compositions for melt extrusion coating. More specifically, the invention relates to a process of coating a solid polymer electrolyte consisting of an amorphous copolymer or terpolymer, with or without salt, or a crystalline polymer wherein a salt or an electrochemically appropriate solid material capable of making it partially amorphous and extrudable is added thereto, by melt extrusion coating on the positive electrode of an all solid lithium battery.

b) Description of Prior Art

ACEP lithium/polymer electrolyte batteries result from the lamination/assembly of three types of main thin films: a film of a positive electrode containing an electrochemically active material such as vanadium oxide, an electrolyte film made of a polymer and a salt of lithium, and a film of lithium. Each of these films has a thickness between 15 and 50 $\mu m$, resulting in a total thickness of 100 to 150 $\mu m$ for the laminated film of elementary battery. About 30 meters of such a film, 15 cm wide, are typically required to give a 100 Wh battery.

The electrolyte films are mainly manufactured by solubilizing the polymer and the salt in a mixture of solvents, followed by coating of the solution and evaporation of the solvents. This process is long lasting and costly because of the low speeds of solubilization and solvent evaporation which can be achieved, and because of the environmental, toxicological and recycling problems caused by the solvents used.

In addition, electrolyte films are coated on coating substrates such as polypropylene film type, which should be peeled off after the electrolyte has been transferred by lamination to the positive electrode. This must be done slowly to avoid peeling the electrolyte together with the substrate and is therefore another costly operation. With certain types of polymers it is possible to eliminate this step by spreading the electrolyte solution directly over the film of positive electrode, as indicated in U.S. Pat. No. 4,968,319 of Nov. 6, 1990, however, this operation is difficult because of the problems of swelling and separation of the underlying positive electrode, and cannot be generalized to all types of polymer electrolytes.

Armand, in U.S. Pat. No. 4,303,748 describes families of polymers which may be used as electrolytes in polymer electrolyte/lithium negative electrode batteries. Armand mentions that different methods may be used to obtain these electrolytes, by means of a solvent process or through a melting process, however he does not specifically indicate how to do this. More elaborate polymer families (copolymers and terpolymers which may or may not be cross-linked) are more specifically described in detail in U.S. Pat. No. 4,578,326; U.S. Pat. No. 4,357,401 and Canadian Patent No. 1,269,702. However, no other details are given with respect to the coating of the electrolyte.

Raychem's U.S. Pat. Nos. 4,818,643 and 5,013,619 describe families of electrolytes which may be prepared by melt extrusion. These families are based on polyoxyethylene, lithium trifluorosulfonate and highly polar liquid plasticizers such as propylene carbonate. The presence of a liquid plasticizer is required in view of the high crystallinity of polyoxyethylene. These compositions are extruded specifically around the lithium electrode to protect the latter by encapsulation and give relatively thick (~0.2–0.3 mm) films of lithium and electrolyte.

The compositions and techniques described in the latter two patents are not suited for the present needs for manufacturing lithium/polymer electrolyte batteries. They require the addition of polar plasticizers which may cause cycling problems in batteries through insertion and irreversible modifications of the materials of the positive electrodes. Their removal by drying introduces an additional step which offsets many of the advantages of the melting technique as compared to the traditional techniques using solvents. The thicknesses which may be obtained in practice (0.2–0.3 mm) are of an order of magnitude too high as compared to the ones required (0.02–0.05 mm) for the electrolytes as well as for the lithium.

It is an object of the present invention to propose a process of coating a polymer electrolyte directly on the cathode by means of a melting technique.

It is another object of the invention to provide for the use of families of electrolytes which enable to overcome the disadvantages of the prior art, using the melting technique without having to rely on the addition of liquid polar plasticizers which are electrochemically not recommended.

Another object of the invention is to propose a method of mounting an electrolyte on the positive electrode which is not provided in the prior art, particularly in U.S. Pat. No. 4,818,643.

It is another object of the invention to propose a method of depositing an electrolyte directly on the positive electrode by melt extrusion, which is more practical and does not have the limitations of using solutions of the electrolyte.

Another object of the invention is to prevent the separation of the positive electrode from the electrolyte.

It is another object of the invention to provide an industrial process for assembling an electrolyte-positive electrode which is free of the environmental, toxicological and economical problems normally encountered with solutions of polymers.

SUMMARY OF INVENTION

In order to fulfill the above mentioned objectives, the invention proposes a process of coating a solid polymer electrolyte on the positive electrode of an all solid lithium battery. This process is characterized in that a composition based on amorphous copolymers or terpolymers with or without salt, or a crystalline polymer to which a salt or electrochemically appropriate solid additive capable of rendering it partially amorphous and extrudable is added, is introduced into an extruder, said composition is extruded in the form of a thin film and said film is directly deposited, by extrusion coating at the outlet of the extruder, on a previously prepared film of positive electrode circulating under the die of the extruder.

According to a preferred embodiment of the invention, the thin film of electrolyte has a thickness between about 10 $\mu$ and about 100 $\mu$, preferably about 30 $\mu$.

According to another preferred embodiment of the invention, the film of positive electrode circulates at a speed between 5 m/min, and about 50 m/min, preferably about 10 m/min.

According to another embodiment of the invention, the extruder is heated at a temperature between about 50° C. and about 230° C. depending on the types of polymers or mixtures of polymers and salts being used.

Preferably, the temperature of the extruder is at about 140° C. for crystalline polymer/salt mixtures and about 100° C. for amorphous polymer/salt mixtures.

According to another preferred embodiment of the invention, the positive electrode has been prepared separately, for example by solvent coating.

A number of amorphous polymers may be used to constitute the electrolyte according to the invention, such as copolymers of ethylene oxide and a cyclic ether oxide, with or without an appropriate lithium salt. More particularly, the amorphous polymers may be selected among those described in the above mentioned patents.

The extruded composition may also include at least one crystalline polymer to which a salt or an appropriate solid additive has been added which can make it partially amorphous and extrudable. For example, a lithium salt which is electrochemically suitable and which presents no handling danger may be added to the crystalline polymer.

According to another preferred embodiment of the invention, the extruded composition consists of homopolymers or copolymers derived from at least one monomer comprising at least one heteroatom capable of giving donor/receptor types of bonds with a lithium cation originating from an appropriate lithium salt such as lithium terfluorosulfonimide or derivatives thereof.

According to another preferred embodiment of the invention, the film of positive electrode circulates at a speed slightly higher than the speed of the thin film of electrolyte at the outlet of the extruder so as to ensure a stretching which provides a homogenous deposit of thin extruded film of the desired thickness on the film of positive electrode. For example, the thin film exits from the extruder at a speed slightly lower than 10 m/min, such as between 5 m/min and 10 m/min while the film of positive electrode circulates at a speed which is equal to at least 10 m/min.

The invention also concerns a composition based on amorphous copolymers or terpolymers, with or without appropriate lithium salt, or based on crystalline polymers to which a salt or an appropriate solid additive has been added to make it partially amorphous for melt coating deposition on the positive electrode of an all solid lithium battery.

According to the invention, and by way of non limiting examples, it may be mentioned that the following compositions are sufficiently amorphous to be used in the molten state without the presence of liquid plasticizers to give films of desired quality and thickness. This amorphous condition may be obtained by the use of naturally amorphous polymers (co- and terpolymers), or by the use of solid plasticizing lithium salts or appropriate solid additives with polymers which are naturally more crystalline and more difficult to extrude into thin films:

1) amorphous copolymers and terpolymers which may or may not be cross-linked, as described in U.S. Pat. Nos. 4,578,326 and 4,758,487.

For example, a copolymer of ethylene and a second monomer unit selected from cyclic etheroxides, substituted or non substituted, may be used. These polymers may be extruded without salt, or with the lithium salt which constitutes the other part of the electrolyte. In this latter case, however, the salt of lithium in addition to being electrochemically suitable, should not be dangerous to handle. This is why lithium perchlorate, which may explode under the conditions of pressure and temperature which are present in an extruder, is excluded. Salts based on lithium terfluorosulfonimide (TFSI) described in U.S. Pat. No. 4,505,997 as well as the lithium salts derived from bis perhalogenoacyl or -sulfonylimide of lithium (TFSM) described in U.S. Pat. No. 4,818,644 (Apr. 4, 1989) and PCT W092/02966 (Jul. 25, 1991) and currently used in ACEP type batteries, are particularly appropriate.

2) the more crystalline polymers described more generally in U.S. Pat. No. 4,303,748, including ethylene polyoxide, provided they are made partially amorphous and extrudable by adding lithium salts of the types described above, or other appropriate solid additives which may act as solid plasticizers.

The polymer/salt compositions containing up to 50% by weight of salt with respect to the polymer, and particularly those containing 20% salt, which correspond to the usual content of ACEP batteries, give satisfactory results during extrusion.

The compositions according to the invention, among others those mentioned above, may be extruded and deposited on a film of positive electrode prepared separately, for example by solvent coating.

The advantages of such a method as compared to the conventional techniques of preparing electrolytes by solvent coating are the following:

rapidity (30 m/min and more, as compared to 1 m/min);

lower cost because of the elimination of the steps of polymer dissolution and solvent drying, vaporizing and recycling (there is about 8 times more solvent than polymer in a typical polymer solution);

absence of environmental and toxicological problems;

better quality of the positive electrode electrolyte interface;

elimination of the steps of lamination and peeling off of the coating substrate from the electrolyte.

BRIEF DESCRIPTION OF DRAWINGS

The invention is on the other hand illustrated by the annexed drawings given by way of simple illustration and without limitation, in which.

DESCRIPTION OF PREFERRED EMBODIMENTS

The following examples illustrate the invention without limitation.

EXAMPLE 1

Two solutions of positive electrode are prepared by dissolving in acetonitrile a copolymer (MW~200,000), vanadium oxide, acetylene black and a lithium salt (TFSI). One solution contains a normal quantity of salt corresponding to a ratio O/Li (oxygen of monomer unit over lithium salt) of 30/1, and the other, an excess of salt (ratio 10/1). These solutions are spread out on a web of aluminum foil 15 cm wide and 15 $\mu$ thick, and evaporated in a drying tunnel to give two dry films of positive electrode each being about 40 $\mu$m thick.

Figure 1:
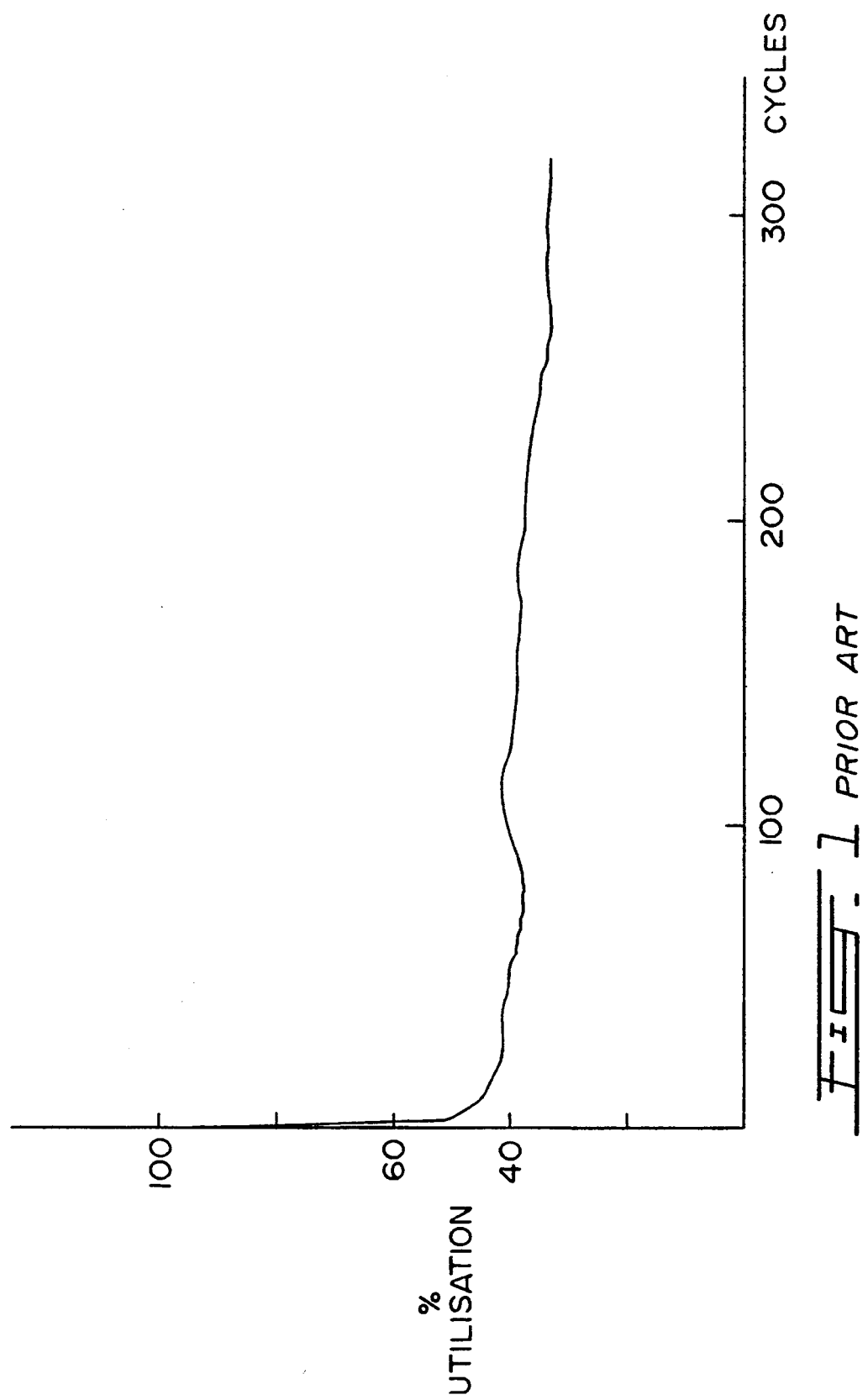
FIG. 1 is a curve illustrating the percentage of utilization of the positive electrode material while cycling a battery in which the electrolyte is prepared from a polymer solution.

An electrolyte solution is prepared by dissolving in acetonitrile a copolymer and a salt in the ratio O/Li=30/1. This solution is spread over a web of polypropylene film 15 cm wide and 25 $\mu$m thick and evaporated to give a film of dry electrolyte about 30 $\mu$m thick. This dry film is thereafter laminated at 70° C. on the film of positive electrode having a composition 30/1 and the film of polypropylene is peeled off. A film of lithium 15 cm wide and 20 $\mu$m thick is thereafter laminated on the electrolyte, and is covered with an insulating film of polypropylene 8 $\mu$m thick and 15 cm wide. A lithium/polymer battery is thus obtained in which the voltage is 3.4V and the % of utilization as a function of cycling is indicated in FIG. 1.

EXAMPLE 2

Figure 2:
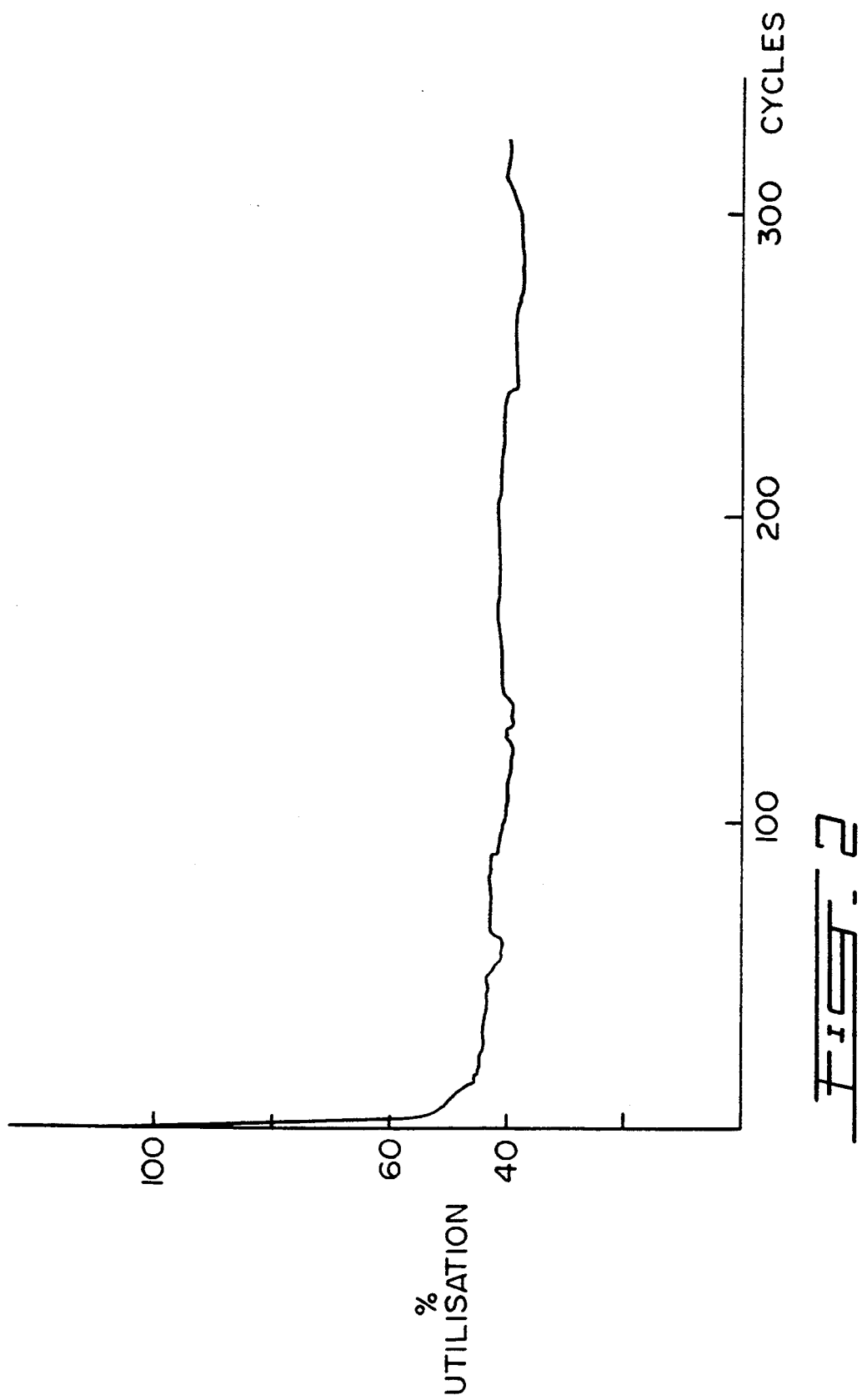
FIG. 2 is a similar curve in the case of a battery according to the invention.

A copolymer Echlin powder (MW~200,000) is introduced into an 3.8 cm double screw extruder, and heated at 140° C. The molten copolymer exits through a die 20 cm wide and is deposited on the film of positive electrode loaded with salt (O/Li=10/1) which is unwound by a system of feed rollers under the die at a speed of about 10 m/min. The film of electrolyte has a uniform thickness of about 30 $\mu$m. Adhesion to and interface with the film of positive electrode are very good. The excess of electrolyte on the sides is cut. A film of lithium 20 $\mu$m thick and 14 cm wide is thereafter laminated on the electrolyte and is covered with an insulating film of polypropylene 8 $\mu$m thick. The battery so constructed has the performance indicated in FIG. 2, which advantageously compares to that obtained by conventional solvent coating (FIG. 1). This good behavior is explained by the rapid diffusion towards the electrolyte of the salt in excess in the positive, so as to give a final equilibrium in the latter corresponding to an O/Li of about 30/1 as in example 1. In addition, the battery has a better power performance (rapid discharge) than the one obtained in Example 1.

EXAMPLE 3

A Warner and Pfilder double screw compounder is used to feed the extruding die. An atmosphere of nitrogen is maintained on the compounder to prevent degradation of the polymer. The copolymer powder is introduced at one end of the compounder and the powder of lithium salt TFSI is introduced into the compounder, in a proportion corresponding to a ratio O/Li=30/1 by means of feeding devices measuring the weights of each powder introduced. The conditions of temperature and extrusion are the same as those of Example 2 at the inlet of the compounder but the temperature is reduced to 100° C. in the second part of the screw containing the lithium salt which starts plasticizing the polymer and facilitates its melting and extrusion. In this case, a film of positive electrode of composition 30/1 is circulated under the die. The battery thus obtained has performances corresponding to those indicated in FIG. 2.

This extrusion process is used for mixtures of copolymer and salt, since the direct extrusion as in Example 2 is not possible. When an attempt is made to mix the two powders, sticky blocks are formed which block the introduction of the powder mixture into the feeding funnel of the extruder.

EXAMPLE 4

Polyoxy ethylene powder (MW~200,000) and a powder of lithium salt TFSI are separately introduced into the compounder as in Example 3. The temperature at the inlet of the compounder is 200° C. and in the second part containing the lithium salt, it is 140° C. The battery thus obtained has similar performances as those indicated in FIG. 2.

I claim:

1. Process for coating a solid polymer electrolyte on a positive electrode of an all solid lithium battery, which comprises introducing an at least partially amorphous homopolymer, copolymer or terpolymer base composition into an extruder, extruding said composition in the form of thin film and directly depositing said thin film, at the outlet of the extruder, on a previously prepared positive electrode film.

2. Process according to claim 1, which comprises circulating the positive electrode film under the die of the extruder when depositing said thin electrolyte film.

3. Process according to claim 1, wherein the thin film has a thickness between about 10 $\mu$ and about 100 $\mu$.

4. Process according to claim 3, wherein the thin film has a thickness of about 30 $\mu$.

5. Process according to claim 1, which comprises allowing the film of positive electrode to circulate at a speed between about 5 m/min and about 50 m/min.

6. Process according to claim 5, wherein the film of positive electrode circulates at a speed of about 10 m/min.

7. Process according to claim 1, which comprises heating the extruder at a temperature between about 50° C. and about 230° C.

8. Process according to claim 7, wherein the temperature of the extruder is at about 140° C. for mixtures of crystalline polymer and salt and about 100° C. for mixtures of amorphous polymer and salt.

9. Process according to claim 1, which comprises extruding said composition through a die capable of producing a film in which the thickness is between about 10 $\mu$ and about 100 $\mu$.

10. Process according to claim 9, wherein said die produces a film in which the thickness is about 30 $\mu$m.

11. Process according to claim 1, wherein the positive electrode has previously been prepared, for example by solvent coating.

12. Process according to claim 1, wherein the extruded composition includes a copolymer of ethylene oxide and an amorphous cyclic ether oxide, with or without an appropriate lithium salt.

13. Process according to claim 1, wherein the extruded composition includes at least one crystalline polymer to which there is added a salt or an electrochemically appropriate solid additive capable of making it partially amorphous.

14. Process according to claim 13, wherein an electrochemically suitable lithium salt which presents no handling danger is added to the crystalline polymer.

15. Process according to claim 1, wherein the extruded composition consists of homopolymers or copolymers derived from at least one monomer comprising at least one heteroatom capable of giving donor/receptor bonds with the cation of an appropriate lithium salt.

16. Process according to claim 15, wherein the lithium salt is selected from lithium terfluorosulfonimide (TFSI) or lithium bis perhalogenoacyl or -sulfonylimide (TFSM).

17. Process according to claim 5, which comprises circulating the film of positive electrode at a speed slightly higher than the speed of the film which exits from the extruder to provide, by stretching, a thin polymer film of required thickness on the film of positive electrode.

18. Process according to claim 17, wherein the thin film exits from the extruder at a speed between about 5 m/min and about 50 m/min.

19. Process according to claim 18, characterized in that said speed is about 10 m/min.

20. Process according to claim 18, wherein the film exits from the extruder at a speed slightly lower than 10 m/min, while the film of positive electrode circulates at a speed at least equal to 10 m/min.

* * * * *